April 7, 1942.    W. H. MILLER    2,278,708
METHOD OF MAKING FASTENING DEVICES
Original Filed Jan. 17, 1939    2 Sheets-Sheet 1
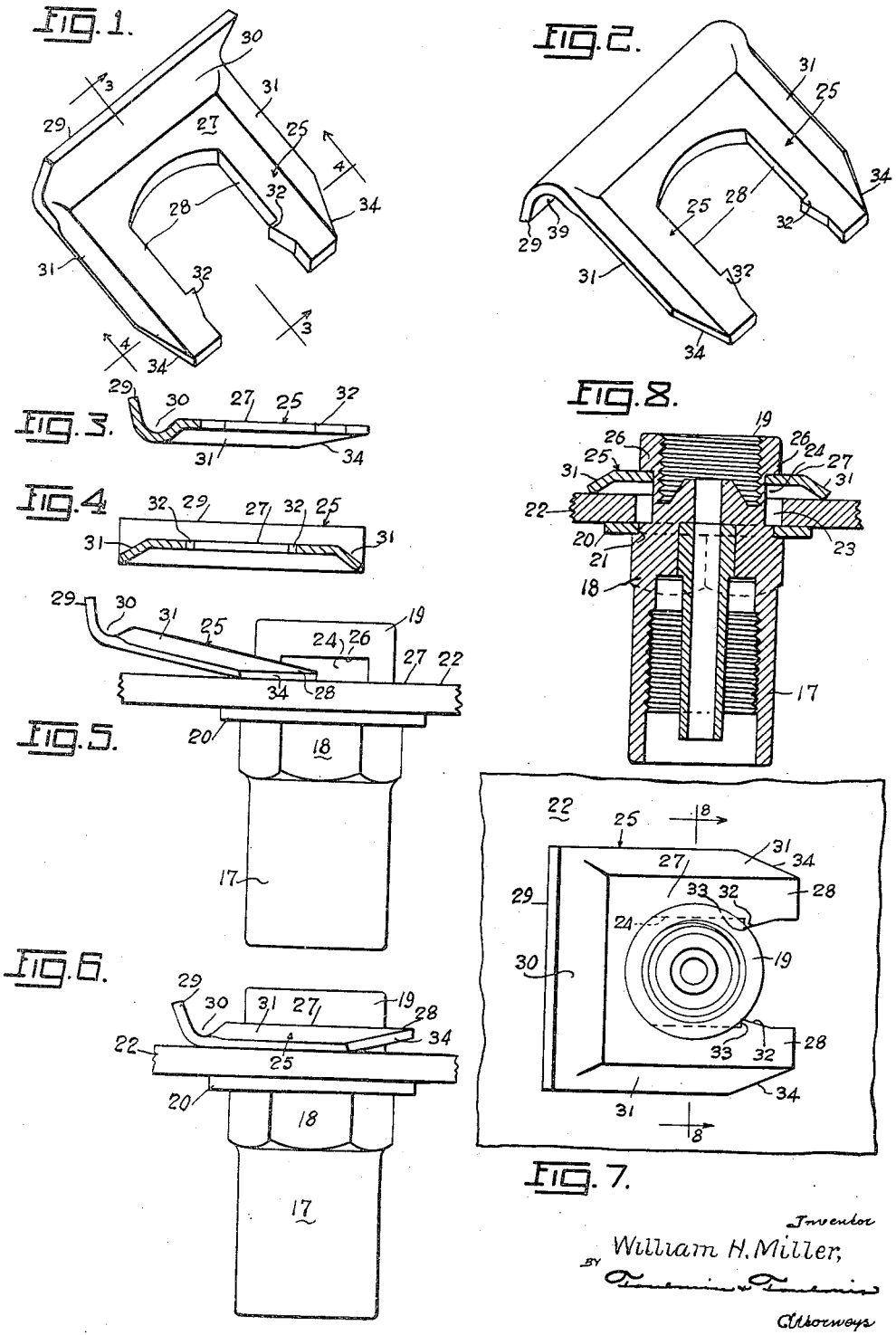
Inventor
William H. Miller,
BY
Attorneys April 7, 1942.  W. H. MILLER  2,278,708
METHOD OF MAKING FASTENING DEVICES
Original Filed Jan. 17, 1939   2 Sheets-Sheet 2
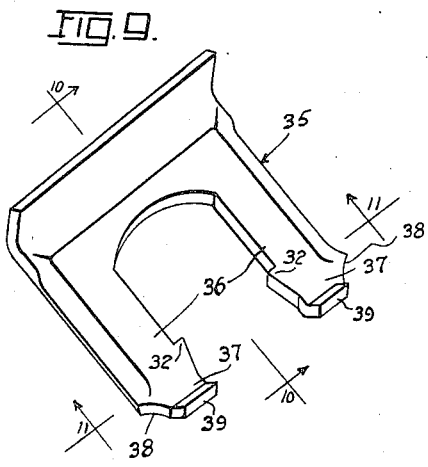
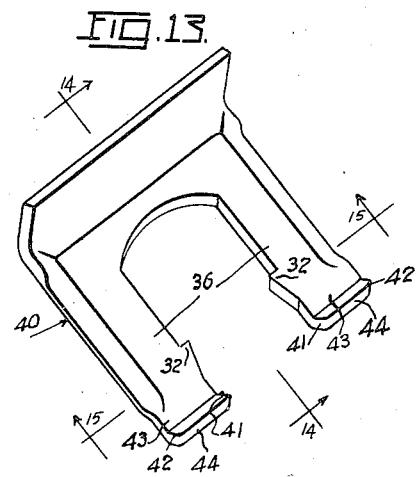
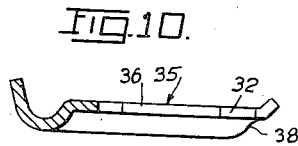
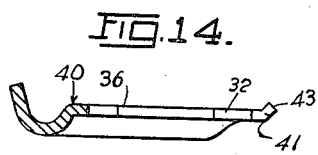
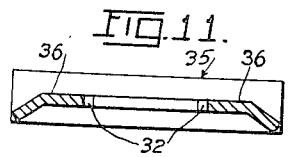
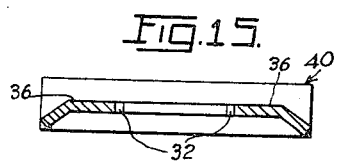
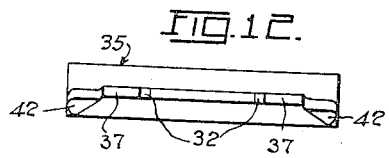
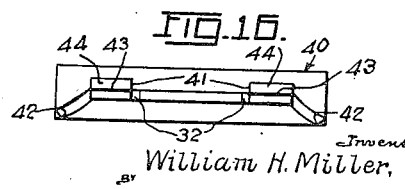

Patented Apr. 7, 1942

2,278,708

UNITED STATES PATENT OFFICE 2,278,708

METHOD OF MAKING FASTENING DEVICES

William H. Miller, Royal Oak, Mich., assignor to The Flex-O-Tube Company, Detroit, Mich., a corporation of Delaware Original application January 17, 1939, Serial No. 251,383. Divided and this application May 29, 1939, Serial No. 276,323

2 Claims. (Cl. 29—148)

This invention relates to improved fastener devices for attaching members to supports, and more particularly for detachably securing tubing, pipes or the like conduits, to a rigid support. This invention is especially adapted for fastening hydraulic brake hose coupling, piping and the like, as commonly employed for conveying hydraulic brake fluid in braking systems, to a suitable support, for instance a wall, panel, brackets or spaced rigid members.

The invention, however, is not limited to the fastening of hydraulic brake tubing, coupling or conduits, but is readily adapted for detachably mounting various members, both solid and tubular, to a support.

In the construction and equipment of various types of machinery, for instance automotive, aeronautical, locomotive and the like, metal tubing is employed for conveying oil, gasoline, water and hydraulic brake fluid from a supply source to various parts of the machine. It is common practice to provide flexible hose connections to the metal tubing in the form of separable couplings. In such construction it has been found desirable to limit the lengths of the metal tubing because during operation of the machine the tubing and couplings are subjected to vibrations, bending stresses and whipping action which accelerate the ultimate cracking and failure of the conduit, piping or tubing. This necessitates that the tubing be rigidly supported at intervals along its length and that the couplings which are somewhat heavier also be supported in order to eliminate vibration during use.

In machines comprising the aforementioned tubing and couplings, it is customary to provide brackets or panel members upon which the coupling or tubing sections may be mounted and firmly supported. These supports are constructed so as to be readily detached from the tubing or coupling when replacement or repair of the same is required.

The principal object of this invention is to provide a novel fastener of rigid construction which affords an economical and highly efficient means for detachably securing the tubing or coupling to a bracket or supporting element of the machine.

Another object is to provide an improved fastener for rigidly maintaining the tubing firmly against its support and which may be readily inserted and removed without substantially marring or injuring the face of the bracket or panel upon which the tubing or coupling is supported.

Another object is to provide a fastener of the type illustrated wherein the ends are cut off at an angle so as to permit the fastener to be tilted downward for inserting into place.

Another object is to provide a fastener which is of rigid wedge-like construction which functions to hold the adjacent parts securely together at all times.

Another object is to provide a novel fastener which is of reinforced construction and is substantially inflexible.

Another object is to provide a novel fastener of improved design which permits usage of the fastener over a wide range which would otherwise be impossible.

Other objects and advantages of this invention will be apparent to those skilled in the art during the course of the following description.

This application is a division of my application Serial No. 251,383, filed January 17, 1939.

The preferred embodiments and modifications of this invention are illustrated in the accompanying drawings wherein:

Figure 1 is a perspective view of one form of the fastening device of this invention;

Figure 2 is a perspective view of the reverse side of the device shown in Figure 1;

Figure 3 is a sectional view thereof taken along the line 3—3 of Figure 1;

Figure 4 is a sectional view taken along the line 4—4 of Figure 1;

Figures 5 and 6 are side elevation views showing the manner of inserting the fastener in place to secure a tubular coupling member to a support;

Figure 7 is a front elevation view of a tubular coupling secured to a support by means of a fastening device of this invention;

Figure 8 is a sectional view taken along the line 8—8 of Figure 7, looking in the direction of the arrows;

Figure 9 is a perspective view of a modified form of the fastener shown in Figures 1 to 8;

Figure 10 is a sectional view of the fastener taken on the line 10—10 of Figure 9;

Figure 11 is a sectional view taken on the line 11—11 of Figure 9;

Figure 12 is an elevation view of the fastener, looking into the open end thereof;

Figure 13 is a perspective view of another modification of the fastener shown in Figures 1 to 8;

Figure 14 is a sectional view taken on the line 14—14 of Figure 13;

Figure 15 is a sectional view taken on the line 15—15 of Figure 13;

Figure 16 is an elevation view of the fastener shown in Figure 13, looking into the open end thereof.

Referring to the drawings in detail, Figures 1 to 4 illustrate one form of the improved fastener of this invention. Figures 5 to 8 show how the improved fastener is used in connection with detachably supporting a hydraulic brake hose coupling. It will be understood that this use of the fastener is merely illustrative of one aspect of this invention, and it will be obvious that the fastener is also adapted for detachably securing conduits or other members to supports at spaced intervals therealong, irrespective of whether couplings are associated therewith.

The tubular coupling shown in Figures 5, 6, 7 and 8 of the drawings is of the conventional compression pipe type and comprises an elongated internally threaded end portion 17 for affording connection to a flexible conduit or hose, not shown, and a central hexagonal section 18 applicable for accommodating a wrench. The opposite end of the coupling body comprises a threaded nipple 19 which is adapted to receive a threaded pipe section.

On the nipple 19, as shown in Figures 5 and 8, and abutting against the hexagonal section 18 is a washer or collar member 20 which is preferably driven or "force fit" upon the shoulder 21 to provide a collar or backing for the bracket plate or panel 22.

The pipe coupling nipple 19 extends through the aperture 23 in the bracket 22. The aperture is of a size such as to accommodate the end of the nipple or tubing extension and presents a smaller opening than the outside diameter of the washer 20 so as to be retained thereagainst. In some instances the collar or washer 20 may be dispensed with, where the hexagonal portion 18 is of sufficient diameter to provide ample backing support for the bracket 22.

External grooves 24 are formed on the nipple portion 19 transversely of its axis and at diametrically opposite sides thereof. These grooves are of such depth and length with respect to the thickness of the pipe wall and bracket that there will be just sufficient space provided for forcibly wedging the fastener member 25 in place between the bracket 22 and groove wall portions 26. It is preferable to undercut the grooves 24, but it will be understood that this is optional. Further the grooves 24 may comprise a single groove which extends all the way around the member 19, or there may be provided a plurality of diametrically opposed grooves or cut-away portions therearound.

The tubing or coupling is held rigidly against the bracket 22 by means of the U-shaped fastener 25 which is readily removable and with which this invention is particularly concerned.

The construction of the fastener device 25 is illustrated in Figures 1 to 4 and comprises a U-shaped rigid or substantially inflexible member having a flat, smooth face 27 for engaging with the member to be fastened to the support. The spaced angle leg members 28 form the sides of the fastener. The upper edge of the closed end consists of an upturned flange member 29. The base of the flange 29 is depressed away from the surface plane of the angle leg members 28 forming a furrow or groove 30 which extends transversely across the top of the fastener. This flange affords a suitable means whereby the fastener can be readily seized by a tool or similar instrument and inserted into place or removed therefrom.

The leg members 28 of the fastener are angle shaped having the outer portions 31 turned downward away from the flat surface plane 27 so as to lend rigidity and reinforcement to the legs. The transverse groove 30 and annular leg members produce a fastener which is entirely reinforced against bending transversely or longitudinally about its axis. The under edges of the flanges 31 lie in the same plane against the bracket or supporting panel 22 and the edges are rounded somewhat so as to afford a surface which will frictionally grip or adhere to the bracket, yet will not cut, gouge or substantially mar the surface thereof. This construction is important where it is desired to use the fastener on the front side of the panel or bracket and where the marring or gouging of the surface would be objectionable.

The upper surface of the leg members 28 is substantially flat and lies in the same plane. On the inner sides of the legs 28, near the open end, are formed the inward projecting hooks 32 which are adapted to engage around the outer surface of the tubular member 19 as at 33 in Figure 7. This provides a locking means for retaining the fastener securely in place.

An important improvement in the construction of the fastener of this invention is the cutting off of the outer corners of the leg members 28, wherein the corners of the downturned flange members 31 are sheared off, as shown at 34. Preferably the cutting is made at approximately a 20 degree angle to the longitudinal axis of the leg but this angle of cutting may be increased or diminished when desired. The diagonal cutting off of the outer corners of the fastener has been found to greatly increase the utility of the fastener and to enhance its ease of inserting into place.

By diagonally shearing off the corners, as shown, the fastener can be tilted downward when starting it into the grooves, as illustrated in Figures 5 and 6, enabling the fastener to be used where the distance between the supporting plate or panel and the outer edges of the groove is very narrow. This improved design permits use of the fastener over a much wider range than would be otherwise possible.

The fastener 35 illustrated in Figures 9 to 12 is of rigid U-shaped construction similar to the fastener illustrated in Figures 1 to 4. In this instance the ends of the leg members 36 are flattened and turned upward so that the end portions 37 lie substantially in the same plane as the upper face of the legs. The outer end corners 38 are cut or sheared off at an angle of approximately 45 degrees and the extremities 39 are upturned slightly. In some instances the under surface of the upturned extremities 39 may be beveled so as to present a relatively thin edge. This construction of the fastener greatly improves the ease of inserting it into place and it may be readily forced into wedging position between the parts without the use of tools. This is an important feature of this improved fastener. Ordinarily, however, the fastener will be started into the grooves by hand and then forced into its locked position by means of a suitable tool.

A modification of the fastener shown in Figures 9 to 12 is illustrated in Figures 13 to 16. In this case the inner and outer corners of the leg members forming the U-shaped fastener 40 are rounded as at 41 and 42. The extremities of the legs 36 are flattened as at 43 and the end portions 44 turned slightly upward similar to the construction of the fastener 35 shown in Figure 9.

The fastener and modifications illustrated in the drawings have been found to be highly efficient for detachably fastening brake hose tubing to a support and the novel construction of the fastener enables it to slide over the face of the support without gouging or marring the same. By reason of the rigid reinforced construction of the fastener it may be removed and replaced many times without undue wear or loss of its efficiency as a fastener.

Prior devices of this nature, which were made resilient and flexible, do not possess the utility and lasting qualities of the fastener constructed according to this invention.

The supporting panel or plate and fastener ordinarily will be made of metal but it will be appreciated that, when desired, they may be formed of other substances, such as wood, synthetic resin plastics, ceramic or equivalent materials.

It will be understood, of course, that this invention is not limited to the exact details of construction and use, since obvious modifications within the scope of this invention may be made by persons skilled in the art without departing from the spirit or scope of the claims appended hereto.

Having thus fully described my invention, what I claim as new and desire to secure by Letters Patent is:

1. An improved method of making a detachable fastening device for securing tubing and the like conduits to a rigid support consisting of the steps of (a) cutting out a U-shaped member from a rigid sheet of material, (b) forming the leg portions into angle members to provide reinforcement along the longitudinal axis thereof, (c) forming a groove adjacent the closed side of said U-shaped fastener to provide an upturned flange across the face thereof, (d) diagonally cutting off the outer corners of the leg extremities, and (e) beveling the end extremities thereof.

2. The method of making a fastening device for wedgedly locking a tubular member to a rigid support, consisting of the following sequence of steps, cutting out a U-shaped rigid inflexible member from a hardened sheet metal material, shaping the leg portions into angle members to provide reinforcement along the longitudinal axis thereof, shaping a groove along the upper edge of the closed end of said U-shaped member to form an upturned flange having the base of the flange depressed away from the surface plane of the leg members, said flange forming a projection for manipulating the fastening device, diagonally shearing off the outer corners of the leg extremities and turning the outer extremities of the leg portion downward away from the flat surface plane of the fastening device and beveling off the end extremities of said leg portions so as to facilitate the insertion of said fastening device in wedging engagement with said tubular member and said rigid support.

WILLIAM H. MILLER.